US006790405B2

(12) United States Patent
Migliorini et al.

(10) Patent No.: US 6,790,405 B2
(45) Date of Patent: *Sep. 14, 2004

(54) POLYOLEFIN FILM WITH EMBOSSED SURFACE

(75) Inventors: Robert Andrew Migliorini, Victor, NY (US); Christopher Nothnagle, Fairport, NY (US); Salvatore James Pellingra, Jr., Wolcott, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 357 days.

This patent is subject to a terminal disclaimer.

(21) Appl. No.: 10/010,839

(22) Filed: Dec. 5, 2001

(65) Prior Publication Data

US 2002/0041057 A1 Apr. 11, 2002

Related U.S. Application Data

(62) Division of application No. 09/280,475, filed on Mar. 30, 1999, now Pat. No. 6,391,425.

(51) Int. Cl.[7] .......................... B29C 35/10; B29C 47/06
(52) U.S. Cl. .................... 264/469; 264/80; 264/146; 264/173.14; 264/173.15; 264/210.2; 264/210.6; 264/480
(58) Field of Search .................. 264/80, 146, 173.14, 264/173.15, 210.2, 210.6, 469, 480

(56) References Cited

U.S. PATENT DOCUMENTS

| 4,413,109 | A |   | 11/1983 | Haas |
| 4,870,122 | A |   | 9/1989  | Lu |
| 4,961,992 | A |   | 10/1990 | Balloni et al. |
| 5,194,318 | A |   | 3/1993  | Migliorini et al. |
| 5,254,394 | A |   | 10/1993 | Bothe et al. |
| 6,461,555 | B1 | * | 10/2002 | Freedman .............. 264/173.15 |
| 2003/0203230 | A1 | * | 10/2003 | Pellingra et al. ........... 428/515 |

FOREIGN PATENT DOCUMENTS

EP          0641647 A2 *   3/1995

* cited by examiner

*Primary Examiner*—Leo B. Tentoni

(57) ABSTRACT

An embossed, cast polyolefin film or an embossed, oriented polyolefin film includes: (a) a core layer including a propylene polymer; (b) an embossed outer layer on one side of the core layer, the embossed outer layer including an olefin polymer capable of being embossed; and (c) an additional outer layer on a side of the core layer opposite to the embossed outer layer, the additional outer layer including an olefin polymer. The embossed film can then be metallized to produce a shiny, metallic film having a prismatic or holographic appearance.

21 Claims, No Drawings

POLYOLEFIN FILM WITH EMBOSSED SURFACE

This divisional application is filed under 37 C.F.R. 1.53 (b), of parent application U.S. Ser. No. 09/280,475, which was filed Mar. 30, 1999, and is now U.S. Pat. No. 6,391,425, the entirety of which is hereby incorporated herein by reference,

FIELD OF THE INVENTION

The present invention relates to a novel cast polyolefin film or oriented polyolefin film having an embossed surface. More particularly, the present invention relates to an embossed cast polyolefin film or an embossed biaxially oriented polyolefin film, wherein the cast film or the oriented film may optionally be metallized to produce final films that are suitable for various applications including prismatic or holographic packaging materials.

BACKGROUND OF THE INVENTION

Films having a prismatic or holographic appearance are already known in the art. These conventional films, however, are dominated by polyester films, which are able to handle the high temperatures needed for this application and provide a visually appealing and strong finished product. The advantage to using the film of the present invention (e.g., a biaxially oriented polypropylene film), however, is primarily in the economics. The polyolefin films (e.g., OPP) of the present invention are less dense than those films made from polyethylene terephthalate, and thus they offer cost savings to the purchaser in an improved yield for the same amount of film by weight. They are also more easily tailored for advantages or benefits in terms of physical properties such as sealability, oxygen and water barrier properties, coefficient of friction, or printability.

The film of the present invention has been tailored to provide a substrate that is easy to emboss, provides a brilliant embossed and metallized surface and also contains a high energy treated surface on the unembossed side for further converting.

U.S. Pat. No. 5,194,318 to Migliorini, et al. discloses a metallized oriented thermoplastic film combination comprising a propylene homopolymer or copolymer substrate (B) having a high density polyethylene (HDPE) skin layer (A) on at least one side thereof, wherein the polyethylene has a thin metal layer deposited thereon. In a preferred embodiment, the use of a heat sealable polymer layer (C) on one side of substrate (B) is also disclosed.

U.S. Pat. No. 4,961,992 to Balloni, et al. discloses a laminated film including first and second webs, the first web including a core layer and a surface layer, the surface layer of the first web containing an effective amount of polydialkylsiloxane to reduce the coefficient of friction thereof, and an adhesive layer bonding the first and second webs to each other. The patent further discloses that the surface or skin layers of each web are sealable, and preferably heat sealable, and that the polydialkylsiloxane is transferred from the skin layer of the first web to the skin layer of the second web in order to reduce the coefficient of friction thereof.

U.S. Pat. No. 4,413,109 to Haas discloses an embossed ethylene-propylene copolymer film having a thickness of less than or equal to 24 microns. The film is made by blow-extruding the ethylene-propylene copolymer into a tubular web, pinching the tubular web between pinch rolls, and embossing the pinched web by passing it between an embossing roll and a pressure roll.

The above-described patents, however, do not disclose an embossed cast film or biaxially oriented film as claimed in the present invention.

SUMMARY OF THE INVENTION

It is an object of the present invention to provide an embossed, oriented polyolefin film that may be metallized to produce a final film having a prismatic or holographic appearance.

It is an alternative object of the present invention to provide an embossed, cast polyolefin film that may be metallized to produce a final film having a prismatic or holographic appearance.

It is another object of the present invention to provide an embossed cast polyolefin film or an embossed, metallized, biaxially oriented polyolefin film having a shiny, metallic prismatic or holographic appearance.

It is a further object of the present invention to provide an embossed cast polyolefin film or an embossed oriented polyolefin film having a high energy surface on the unembossed side, wherein the high energy surface may be further converted after metallization.

It is yet another object of the present invention to provide a process for producing an embossed cast polyolefin film or an oriented polyolefin film that has a brilliant embossed appearance without leaving any residue on the embossing machine.

In accordance with these and other objects of the present invention, an embossed cast polyolefin film or an embossed oriented polyolefin film is provided, wherein the film comprises:

(a) a core layer comprising a propylene polymer;

(b) an embossed outer layer on one side of said core layer, said embossed outer layer comprising an olefin polymer capable of being embossed; and (c) an additional outer layer on a side of said core layer opposite to said embossed outer layer, said additional outer layer comprising an olefin polymer.

In a preferred embodiment of the present invention, the embossed surface of the film of the present invention is metallized to provide a final film having a shiny, metallic prismatic or holographic appearance.

In another preferred embodiment of the present invention, the embossed outer layer (b) and/or the additional outer layer (c) may constitute the skin layers of the film.

In yet another preferred embodiment of the present invention, a cast polyolefin film or an embossed biaxially oriented polypropylene film is disclosed, wherein the film comprises:

(a) a core layer comprising a propylene homopolymer or copolymer;

(b) an embossed outer layer on one side of the core layer, said embossed outer layer comprising an ethylene-propylene-butylene (EPB) terpolymer or an ethylene-propylene (EP) copolymer; and (c) an additional outer layer on a side of said core opposite to said embossed outer layer, said additional outer layer comprising a high density polyethylene (HDPE), the surface of which is optionally treated to aid in further converting.

DETAILED DESCRIPTION OF THE INVENTION

The film of the present invention should preferably be capable of being heated to temperatures between about 230°

F. and about 275° F. without distortion or leaving any residue, and should also have a surface soft enough to receive the embossed image or pattern.

The core layer (a) of the cast or oriented film of the present invention comprises a propylene polymer. In the present invention, the term "propylene polymer" includes homopolymers as well as copolymers of propylene. Preferably, however, the propylene polymer is a polypropylene homopolymer.

The propylene polymer of the core layer (a) preferably has an isotacticity ranging from about 80 to 100%, most preferably about 95 to 96%, as measured by $^{13}C$ NMR spectroscopy using meso pentads. Further, the propylene polymer of the core layer preferably has a melt index ranging from about 2 to about 10 g/10 minutes, most preferably from about 3 to about 6 g/10 minutes, as measured according to ASTM D1238 at 190° C. under a load of 5 lbs.

Commercially available propylene polymers for the core layer (a) include, but are not limited to, FINA 3371, which is an isotactic polypropylene homopolymer sold by Fina Oil and Chemical Company.

The olefin polymer of the embossed outer layer (b) may be selected from any olefin polymer that is capable of being embossed and that satisfies the requirements of the present invention. Suitable examples of olefin polymers that may be used for the embossed outer layer (b) include, but are not limited to, ethylene-propylene-butylene (EPB) terpolymers, ethylene-propylene (EP) copolymers, metallocene catalyzed polyethylenes, syndiotactic polypropylenes, propylene-butylene random copolymers, and blends of any of the above components, with or without isotactic polypropylene homopolymer. The suitability of other useful polymers can be determined by those skilled in the art.

Preferably, the olefin polymer of the embossed outer layer (b) is an EPB terpolymer or an EP copolymer. The preferred comonomer contents of the EPB terpolymer may be, e.g., about 0.5 to about 5% ethylene and about 1.0 to about 23% butylene, while the preferred comonomer content of the EP copolymer may be, e.g., about 2.0 to about 8.0% ethylene. The metallocene catalyzed polyethylene may have a density of from about 0.910 to about 0.940 g/cm$^3$.

Commercially useful EPB terpolymer materials include, but are not limited to, CHISSO XPM 7701, which contains an EPB terpolymer having 4% by weight of ethylene and 4% by weight of butylene and 2300 ppm of SYLOBLOC 44 silica antiblocking agent. Other EPB terpolymers include SW001 and WSN709N sold by Sumitomo, in which the comonomer contents are 0.9% by weight ethylene and 22.5% butylene. As for the EP copolymer, FINA 8573 having an ethylene content of 3.55% by weight has been used with success.

Additionally, the olefin polymer of the embossed outer layer (b), in layer form, should preferably be capable of being soft embossed at temperatures between about 230° F. and about 280° F. and a pressure of about 200 psi.

The embossed outer layer (b) of the present invention may contain additives such as antiblock agents to improve web handling during winding and converting. Suitable amounts of such antiblock agents may range from about 500 to about 3,000 ppm, preferably from about 2,000 to about 2,500 ppm. Preferably, the antiblock agents are silica. Further, the antiblock agents may have particle sizes ranging from about 1 to about 10 microns, preferably from about 3.5 to about 5 microns.

Further, the embossed outer layer (b) may be treated (e.g., flame or corona discharge treated) to improve the adhesion of the metal to be deposited in an optional metallization step.

The olefin polymer of the additional outer layer (c) may also be selected from a wide variety of polymeric materials, but should be capable of providing a high energy surface for further converting steps after optional metallization. Examples of such olefin polymers useful for the additional outer layer (c) include, but are not limited to, a high density polyethylene (HDPE), a polypropylene homopolymer, an EPB terpolymer, an EP copolymer, a propylene-butylene copolymer (e.g., a butylene content of 2.0 to 12.0% by weight), a linear low density polyethylene (LLDPE), or a blend of any of these materials. These polymers may also be coated with an acrylic or other type coating in order to obtained desired properties, as is well known in the art of polyolefin films.

The use of HDPE as the material for the additional outer layer (c) is most preferred. The contemplated HDPE materials include polyethylenes having a density of about 0.950 or greater, and include the HDPE resins disclosed in U.S. Pat. No. 4,870,122 to Lu, which is incorporated herein by reference. Commercially useful HDPE resins include, but are not limited to, EXXON HD 6704.67 sold by Exxon.

As described above, the additional outer layer (c) is preferably treated (e.g., flame or corona discharge treated) to provide a high energy surface to aid in additional optional converting steps following optional metallization.

Like the embossed outer layer (b), the additional outer layer (c) may also contain additives such as antiblock agents or particles to improve the web handling during winding and converting. Suitable amounts of such antiblock agents may range from about 500 to about 2,500 ppm, more preferably from about 750 to about 1,000 ppm. Preferably, the antiblock agents for the additional outer layer (c) are silica. Further, the antiblock agents preferably have particle sizes ranging from about 1 to about 10 microns, more preferably about 3.5 to about 5 microns.

In one aspect, the film of the present invention comprises a three-layer structure comprising the core layer (a), the embossed outer layer (b), and the additional outer layer (c), wherein outer layers (b) and (c) are skin layers. However, the present invention contemplates films having more than three layers (e.g., four, five, six, seven or more layers). For example, intermediate or tie layer(s) may be present in the films of the present invention.

The intermediate or tie layer(s) of the present invention, if used, may be any of the castable or coextrudable, biaxially orientable film-forming resins known in the art. Such materials include substantially isotactic polypropylene, substantially syndiotactic polypropylene, polyethylenes, copolymers with ethylene and terpolymers that include monomers such as ethylene and/or butene-1 and/or higher alpha-olefins. The polyethylenes that can be used in the intermediate or tie layers include low density polyethylene (LDPE), linear low density polyethylene (LLDPE), medium density polyethylene (MDPE) or high density polyethylene (HDPE). Typical copolymers are ethylene-propylene random copolymers, ethylene-butene-1 copolymers, propylene-butylene random copolymers, and ethylene-propylene block/impact copolymers. Typical terpolymers are random ethylene-propylene-butene-1 terpolymers, and block terpolymers of ethylene, propylene and butene-1. The polymers contained in the intermediate or tie layer(s) include, but are not limited to, both Ziegler-Natta and metallocene catalyzed polypropylene. Alternative and useful thermoplastic materials for the additional layer(s) include polyamides and polyesters. Blends of any of the foregoing homopolymers, copolymers and terpolymers are also contemplated.

In the present invention, the overall thickness of the film may be from about 40 to about 500 gauge units, more preferably from about 50 to about 200 gauge units. The skin layer on the embossed side of the film may be from about 0.5 to about 8.0 gauge units, more preferably between 2.0 and 6.0 gauge units, and most desirably 4 gauge units. The skin layer on the opposite side may have a thickness of from about 0.5 to 8.0 gauge units, more preferably between about 2.0 and 4.0 gauge units.

Preferably, the film structure, in particular the core layer of the structure, should be free or substantially free from migratory additives (e.g., fatty acid amides, antistats, etc.) that can subsequently deposit residues on the embossing machine, interfere with the metallization step, or detrimentally affect the appearance of the final film. However, in order to modify or enhance certain properties of the multi-layer films of the present invention for specific end-uses, it is possible for one or more of the layers to contain appropriate additives, including migratory additives, in effective amounts. Preferred additives, other than the antiblock agents described above for the embossed outer layer (b) and the additional outer layer (c), include antistatic agents, other antiblocking agents, lubricants, stabilizers and/or one or more of a class of hydrocarbon resins, such as alicyclic hydrocarbon resins. Such additives are further described in U.S. Pat. No. 5,254,394, which is incorporated herein by reference. It is useful to incorporate additives such as wax, finely divided inorganic antiblock particles, silicone oil, crosslinked polymethyl methacrylate (PMMA) particles, and silicone spheres such as non-migratory particulate crosslinked hydrocarbyl-substituted polysiloxane slip agents, such as TOSPEARL which is marketed world-wide by Toshiba Silicone Co., Ltd. and in the United States by General Electric. The alicyclic hydrocarbons include polyterpenes, petroleum resins and "hard" resins employed in the films. PICCOLYTE and REGALREZ from Hercules, ZONTEC from Arizona Chemicals Co., ARKON from Arakawa Chemical, ESCOREZ from Exxon are some of the commercial materials that are available. Other additives that can be incorporated into one or more layers of the film include nucleators, such as MILLAD 3938 from Milliken for crystal structure and carbon black for brightening.

The multi-layer films of the present invention may be prepared employing commercially available systems. In the production of an oriented film, it is preferred that all layers of the multi-layer film structures of the present invention be coextruded. Thereafter, the film is biaxially oriented. Specifically, the polymers are brought to the molten state and coextruded from a conventional extruder through a flat sheet die, wherein the melt streams are combined in an adapter prior to being extruded from the die or within the die. After leaving the die, the multi-layer film is chilled and the quenched sheet is reheated and oriented.

Preferably, the film is oriented by biaxially stretching the film. The film can be oriented by stretching from about 3.5 to about 6.5 times in the machine direction at temperatures ranging from about 215° F. to about 300° F. and from about 5 to about 14 times in the transverse direction (TD) at temperatures ranging from about 300° F. to about 380° F.

Subsequently, the oriented film is heated, embossed, optionally treated, optionally slit, and then optionally metallized to produce a final film having a prismatic or holographic appearance. The preferred method of producing the final film with a prismatic or holographic appearance comprises heating the embossable surface of the film to soften it, embossing the surface with an engraved roll that leaves a mirror image of the roll's image on the film, and subsequently metallizing the embossed surface to give the film its unique appearance.

The preferred embossing method for use in the present invention is known as "soft embossing." Soft embossing is a process by which the film is embossed at a pressure of about 200 psi so as to emboss only one side of the film, an outward surface, and leave the opposite side of the film, an another outward surface, essentially untouched. However, a method known as "hard embossing" may also be used. Unlike soft embossing, hard embossing is performed at about 1000 psi and, in general, the embossing can extend all the way through the film. An embossed surface thereby may be provided on the outer surface and with a substantially corresponding embossed surface evidenced on the another outer surface. Thus, all the layers of the film of the present invention may be soft enough to be embossed.

Alternatively, other embossing methods may also be used in the present invention. For example, an alternative embossing method may include coating a pattern on the embossable side of the film. Such an embossed surface of the film may then be metallized.

In one aspect of the present invention, the embossing step is incorporated in the orientation machine between the TDO exit and the corona discharge or flame treater section via a series of preheat rolls and an embossing roll. The advantage of such an embodiment is that a much more cost-effective process for embossing the film is provided. Specifically, this embodiment would eliminate the extra steps of embossing and then treating the embossed surface. It provides an efficient method in which embossing is performed while the film is being made.

For instance, after the film is coextruded and drawn in the MD and TD directions, the embossing can take place after the TDO ovens but before corona or flame treaters. This permits the completion of all steps of the film production process using one machine. The film could be made, oriented, embossed, and then treated. The film can then be metallized, saving the extra out-of-line process steps before metallization.

Alternatively, the embossing step is incorporated in a cast machine between the caster and the corona discharge or flamer treater section via a series of preheat rolls and an embossing roll. The embossed, cast polyolefin film of the present invention is made by a similar process as compared to the oriented films, except the cast film is made by pouring, spreading, or extruding the molten polymeric material onto a temporary carrier, solidifying the material by any suitable means, and removing it from the carrier. Such cast film production methods are known in the art, and include the well-known chill roll cast process, but other methods can be used.

As another alternative, the embossing and treating of the embossed layer are incorporated into the slitting process. The slitting process is where master rolls produced on the orienter or casting machine are cut and rewound into narrower rolls for further processing (metallizing) or directly for shipment to customers on a machine known as a slitter. A series of preheated rolls are positioned after the unwind stand of the slitter to preheat the film to the necessary temperature for embossing. This is followed by an embossing roll to engrave the embossable surface of the film with the appropriate pattern. This is followed by a corona or flame treater also positioned on the slitter between the unwind and rewind section to treat the embossed surface layer to a surface tension to readily accept aluminum. The embossed and treated film would be finally subsequently slit and rewound to the appropriate width for further processing (metallizing) or direct shipment to the customer. The incorporation of the embossing and treating in the slitting process also provides the advantage of a more cost-effective process for embossing the film by combining process steps together.

The metallizing step in the production of the may be accomplished using any of the techniques known in the art, such as vacuum metallization of aluminum.

The following examples illustrate the effectiveness of the present invention without limiting the scope thereof.

EXAMPLES

Two films, each having an "ABC" type structure, were produced. In each film, the total thickness of the film was 80 gauge units. Layers A, B, and C represent the additional outer layer, the core layer, and the embossed outer layer, respectively. In each film, layer A had a thickness of 2 gauge units, layer B had a thickness of 74 gauge units, and layer C had a thickness of 4 gauge units.

Example 1

Layers A (additional outer layer), B (core layer), and C (embossed outer layer) were melt coextruded through a die using three extruders working in association at 470° F., 485° F., and 460° F., respectively. Layer A was made from a composition containing EXXON HD 6704.67 HDPE resin and 780 ppm SYLOBLOC 45 silica antiblock agent. Layer B was made from FINA 3371 polypropylene homopolymer. Layer C was made from CHISSO XPM 7701, which is a blend of an EPB terpolymer (4% by weight ethylene and 4% by weight butylene) with 2,300 ppm SYLOBLOC 44 silica antiblock agent. The die temperature was maintained at 485° F.

The coextruded film was then quenched using a water bath maintained at 100° F. The coextruded film was then oriented in the machine direction about 4.6 times at 245° F., and about 9 times in the transverse direction at 336° F.

Following orientation, the film was flame treated on the HDPE side to provide surface offline level of about 50 to about 55 dynes/cm and then rolled. The film in roll form was thereafter run on the embossing machine, in which the line speed was 150 feet/minute. The film had approximately ⅝'s wrap on about a 10" diameter hot roll to soften the embossable side. The temperature of the hot roll was maintained at about 240° F. to about 265° F. After the film was heated on the hot roll, the film was then embossed between the embossing roll and EPDM rubber or similar nip. The pressure of the embossing roll was about 200 psi. This operation forms the image or pattern on the embossable surface of the film.

The embossed side of the film was then corona treated to improve the adhesion of metal from the metallization step. Lastly, the film was vacuum metallized using aluminum to give a unique appearance.

The final film produced had a shiny, metallic appearance over the embossed surface.

Example 2

Example 1 was repeated, except the EPB terpolymer of Layer C was replaced with FINA 8573 EP copolymer (3.55% by weight ethylene).

The final film produced in this example also had a shiny, metallic appearance over the embossed surface.

What is claimed is:

1. A process for producing an embossed polyolefin film comprising:

(a) providing a cast polyolefin film or an oriented polyolefin film, wherein the film comprises,
  (i) a core layer consisting of an isotactic propylene homopolymer and, optionally, at least one additive selected from the group consisting of antistatic agents, antiblocking agents, lubricants, stabilizers, and hydrocarbon resins,
  (ii) an embossable outer layer on a side of said core layer, said embossable outer layer comprising an olefin polymer and having an outward surface on a side of the embossable outer layer opposite a core layer side of the embossable outer layer, and
  (iii) an additional outer layer on a side of said core layer opposite to said embossable outer layer, said additional outer layer comprising an olefin polymer and having an another outward surface on a side of the additional outer layer opposite a core layer side of the additional outer layer; and
(b) embossing at least the embossable outer layer of the cast or oriented polyolefin film, creating an embossed surface on the outward surface of the cast or oriented polyolefin film.

2. The process according to claim 1, further comprising: treating at least one of the embossed surface and the another outward surface of the cast or oriented film with at least one of corona and flame discharge treating.

3. A process for producing an embossed polyolefin film comprising:

(a) providing a cast polyolefin film or an oriented polyolefin film, wherein the film comprises,
  (i) a core layer comprising a propylene polymer,
  (ii) an embossable outer layer on a side of said core layer, said embossable outer layer comprising an olefin polymer and having an outward surface on a side of the embossable outer layer opposite a core layer side of the embossable outer layer, and
  (iii) an additional outer layer on a side of said core layer opposite to said embossable outer layer, said additional outer layer comprising an olefin polymer and having an another outward surface on a side of the additional outer layer opposite a core layer side of the additional outer layer; and
(b) embossing at least the embossable outer layer of the cast or oriented polyolefin film, creating an embossed surface on the outward surface of the cast or oriented polyolefin film,
wherein the process further comprises metallizing the embossed surface of the cast or oriented film.

4. A process for producing an embossed polyolefin film comprising:

(a) providing a cast polyolefin film or an oriented polyolefin film, wherein the film comprises,
  (i) a core layer comprising a propylene polymer,
  (ii) an embossable outer layer on a side of said core layer, said embossable outer layer comprising an olefin polymer and having an outward surface on a side of the embossable outer layer opposite a core layer side of the embossable outer layer, and
  (iii) an additional outer layer on a side of said core layer opposite to said embossable outer layer, said additional outer layer comprising an olefin polymer and having an another outward surface on a side of the additional outer layer opposite a core layer side of the additional outer layer; and
(b) embossing at least the embossable outer layer of the cast or oriented polyolefin film, creating an embossed surface on the outward surface of the cast or oriented polyolefin film, wherein the process further comprises heating the outward surface of the embossable outer layer of the cast or oriented film prior to embossing to soften the embossable outer layer.

5. A process for producing an embossed polyolefin film comprising:

(a) providing a cast polyolefin film or an oriented polyolefin film, wherein the film comprises,
  (i) a core layer comprising a propylene polymer,
  (ii) an embossable outer layer on a side of said core layer, said embossable outer layer comprising an olefin polymer and having an outward surface on a side of the embossable outer layer opposite a core layer side of the embossable outer layer, and
  (iii) an additional outer layer on a side of said core layer opposite to said embossable outer layer, said additional outer layer comprising an olefin polymer and having an another outward surface on a side of the additional outer layer opposite a core layer side of the additional outer layer; and
(b) embossing at least the embossable outer layer of the cast or oriented polyolefin film, creating an embossed surface on the outward surface of the cast or oriented polyolefin film, wherein the process further comprises hard embossing the cast or oriented film to simultaneously emboss each of the embossable outer layer, the core layer, and the additional outer layer, creating an embossed surface on the outward surface of the embossable outer layer and another embossed surface on the another outward surface of the additional outer layer.

6. The process according to claim 1, wherein embossing at least the embossable outer layer comprises applying a coating to the outward surface of the embossable outer layer in a pattern, creating an embossed surface on the outward surface of the cast or oriented polyolefin film.

7. A process for producing an embossed polyolefin film comprising:

(a) providing a cast polyolefin film or an oriented polyolefin film, wherein the film comprises,
  (i) a core layer comprising a propylene polymer,
  (ii) an embossable outer layer on a side of said core layer, said embossable outer layer comprising an olefin polymer and having an outward surface on a side of the embossable outer layer opposite a core layer side of the embossable outer layer, and
  (iii) an additional outer layer on a side of said core layer opposite to said embossable outer layer, said additional outer layer comprising an olefin polymer and having an another outward surface on a side of the additional outer layer opposite a core layer side of the additional outer layer; and
(b) embossing at least the embossable outer layer of the cast or oriented polyolefin film, creating an embossed surface on the outward surface of the cast or oriented polyolefin film, wherein embossing at least the embossable outer layer comprises embossing the oriented polyolefin film after the film exits an orienter and before the film is treated with at least one of corona and flame discharge treating.

8. The process according to claim 7, wherein embossing at least the embossable outer layer includes contacting the film with a preheat roll and an embossing roll.

9. The process according to claim 1, further comprising:
selecting the olefin polymer of the embossed outer layer from the group consisting of an ethylene-propylene-butylene (EPB) terpolymer and an ethylene-propylene (EP) copolymer.

10. The process according to claim 1, further comprising:
providing a high density polyethylene (HDPE) for the olefin polymer of the additional outer layer.

11. A process for producing an embossed polyolefin film comprising:

(a) providing a cast polyolefin film or an oriented polyolefin film, wherein the film comprises,
  (i) a core layer comprising a propylene polymer,
  (ii) an embossable outer layer on a side of said core layer, said embossable outer layer comprising an olefin polymer and having an outward surface on a side of the embossable outer layer opposite a core layer side of the embossable outer layer, and
  (iii) an additional outer layer on a side of said core layer opposite to said embossable outer layer, said additional outer layer comprising an olefin polymer and having an another outward surface on a side of the additional outer layer opposite a core layer side of the additional outer layer; and
(b) embossing at least the embossable outer layer of the cast or oriented polyolefin film, creating an embossed surface on the outward surface of the cast or oriented polyolefin film, wherein embossing at least the embossable outer layer comprises embossing the cast polyolefin film prior to treating the film with at least one of corona and flame discharge treating.

12. The process according to claim 11, wherein embossing at least the embossable outer layer includes contacting the film with a preheat roll and an embossing roll.

13. A process for producing an embossed polyolefin film comprising:

(a) providing a cast polyolefin film or an oriented polyolefin film, wherein the film comprises,
  (i) a core layer comprising a propylene polymer,
  (ii) an embossable outer layer on one side of said core layer, said embossable outer layer comprising an olefin polymer and having an outward surface on a side of the embossable outer layer opposite a core layer side of the embossable outer layer, and
  (iii) an additional outer layer on a side of said core layer opposite to said embossable outer layer, said additional outer layer comprising an olefin polymer and having an another outward surface on a side of the additional outer layer opposite a core layer side of the additional outer layer;
(b) heating the embossable outer layer of the cast or oriented film;
(c) embossing at least the embossable outer layer of the cast or oriented polyolefin film, forming an embossed surface on the outward surface of the cast or oriented polyolefin film;
(d) treating at least one of the embossed surface and the another outward surface of the cast or oriented film with at least one of corona or flame discharge treating; and
(e) slitting the treated film with a slitter machine.

14. The process according to claim 13, further comprising: metallizing the embossed surface of the film.

15. The process according to claim 13, wherein slitting the treated film further comprises:

unwinding a master roll of oriented or cast polyolefin film;

cutting the film unwound from the master roll, into at least one narrower roll of film; and rewinding each of the at least one narrower roll of film into a rewound narrower roll of film.

16. The process according to claim 15, further comprising:

contacting the embossable outer layer of the film unwound from the master roll with at least one heated roll prior to rewinding each of the at least one narrower roll of film, to heat the film; and contacting the outward surface of the embossable outer layer of the heated film unwound from the master roll with an embossing roll.

17. The process according to claim 16, wherein the film is corona or flame treated on the slitter machine, before rewinding each of the at least one narrower roll of film into a rewound narrower roll of film.

18. The process according to claim 13, further comprising:

selecting the olefin polymer of the embossed outer layer from the group consisting of an ethylene-propylene-butylene (EPB) terpolymer and an ethylene-propylene (EP) copolymer.

19. The process according to claim 13, further comprising:

providing a high density polyethylene (HDPE) for the olefin polymer of the additional outer layer.

20. The process according to claim 13, further comprising:

providing a core layer consisting of an isotactic propylene copolymer and at least one additive selected from the group consisting of antistatic agents, antiblocking agents, lubricants, stabilizers, and hydrocarbon resins.

21. The process according to claim 13, further comprising:

heating the embossable outer layer to a temperature of between about 230° F. and about 280° F.; and soft embossing the film by applying an embossing force of about 200 psi to the heated embossable outer layer.

* * * * *